(12) United States Patent
Imai

(10) Patent No.: US 7,200,265 B2
(45) Date of Patent: Apr. 3, 2007

(54) IMAGE PROCESSING APPARATUS, IMAGE PROCESSING METHOD, IMAGE PROCESSING PROGRAM, AND MEDIUM RECORDING THE IMAGE PROCESSING PROGRAM

(75) Inventor: Toshie Imai, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 814 days.

(21) Appl. No.: 10/374,551

(22) Filed: Feb. 25, 2003

(65) Prior Publication Data
US 2003/0231347 A1 Dec. 18, 2003

(30) Foreign Application Priority Data
Feb. 26, 2002 (JP) ............................ 2002-049370

(51) Int. Cl.
G06K 9/00 (2006.01)
G06K 15/00 (2006.01)
H04N 5/14 (2006.01)

(52) U.S. Cl. .................. 382/168; 358/2.1; 348/672

(58) Field of Classification Search ............... 382/162, 382/274, 167–173; 358/500, 537, 2.1, 521, 358/522, 534, 536; 345/600–602; 348/672, 348/687
See application file for complete search history.

(56) References Cited

U.S. PATENT DOCUMENTS 6,694,051 B1 * 2/2004 Yamazoe et al. ........... 382/167
6,873,729 B2 * 3/2005 Matsushima ............... 382/167

FOREIGN PATENT DOCUMENTS

| JP | 04-310077 | 11/1992 |
| JP | 09-016765 | 1/1997 |
| JP | 09-037145 | 2/1997 |
| JP | 09-051472 | 2/1997 |
| JP | 11-032236 | 2/1999 |
| JP | 2000-134467 | 5/2000 |
| JP | 2002-006390 | 1/2002 |
| JP | 2002-281312 | 9/2002 |

OTHER PUBLICATIONS

Abstract of Japanese Patent Publication No. 04-310077, Pub. Date: Nov. 2, 1992, Patent Abstracts of Japan.
Abstract of Japanese Patent Publication No. 09-016765, Pub. Date: Jan. 17, 1997, Patent Abstracts of Japan.

(Continued)

Primary Examiner—Kanjibhai Patel
(74) Attorney, Agent, or Firm—Martine Penilla & Gencarella, LLP

(57) ABSTRACT

Proper lightness correction is unavailable if a determination is unsuccessfully made whether or not an image to be retouched is a backlight image. A distribution ratio of luminance components is obtained from an image whose type is to be determined. The similarity is determined between the distribution ratio and a distribution ratio in the image of a specific type. When the similarity is acknowledged, it is determined that the image under inspection corresponds to the specific type. When a distribution ratio for backlight image is obtained in advance as the distribution ratio for the specific type of image, the above-mentioned determination process makes it possible to accurately determine whether or not the image under inspection is a backlight image.

15 Claims, 12 Drawing Sheets

OTHER PUBLICATIONS

Abstract of Japanese Patent Publication No. 09-037145, Pub. Date: Feb. 7, 1997, Patent Abstracts of Japan.
Abstract of Japanese Patent Publication No. 09-051472, Pub. Date: Feb. 18, 1997, Patent Abstracts of Japan.
Abstract of Japanese Patent Publication No. 11-032236, Pub. Date: Feb. 2, 1999, Patent Abstracts of Japan.
Abstract of Japanese Patent Publication No. 2000-134467, Pub. Date: May 12, 2000, Patent Abstracts of Japan.
Abstract of Japanese Patent Publication No. 2002-006390, Pub. Date: Jan. 9, 2002, Patent Abstracts of Japan.
Abstract of Japanese Patent Publication No. 2002-281312, Pub. Date: Sep. 27, 2002, Patent Abstracts of Japan.

* cited by examiner

FIG. 7

$\vec{g_0} = (5, 4, 0, 0, 1)$ $\vec{g_1} = (a_1, b_1, c_1, d_1, e_1) \rightarrow \dfrac{\vec{g_0} \cdot \vec{g_1}}{|\vec{g_0}||\vec{g_1}|} = \cos\theta = 0.91$ (Backlight image 150a)

$\vec{g_2} = (a_2, b_2, c_2, d_2, e_2) \rightarrow \dfrac{\vec{g_0} \cdot \vec{g_2}}{|\vec{g_0}||\vec{g_2}|} = 0.62$ (Ordinary image 150b)

$\vec{g_3} = (a_3, b_3, c_3, d_3, e_3) \rightarrow \dfrac{\vec{g_0} \cdot \vec{g_3}}{|\vec{g_0}||\vec{g_3}|} = 0.88 \xrightarrow{\times(-1)} -0.88$ (Non-backlight image 150c)

IMAGE PROCESSING APPARATUS, IMAGE PROCESSING METHOD, IMAGE PROCESSING PROGRAM, AND MEDIUM RECORDING THE IMAGE PROCESSING PROGRAM

BACKGROUND OF THE INVENTION

1. Field of the Invention

The present invention relates to an image processing apparatus, an image processing method, an image processing program, and a medium recording the image processing program.

2. Description of Related Art

As there has been an improvement in performance of ink jet printers and digital cameras in recent years, it has become possible at home to produce printouts having the quality equivalent to that of silver halide films. A printout here concerns digital images. Since digital images can be easily retouched, it is a common practice to apply various modifications to the digital images for improving the image quality by using photo retouch software, a printer driver, and the like. Since the retouching requires some experience, however, various automatic retouch features are provided.

Since digital images can be easily retouched, it is possible to apply, e.g., lightness correction to an image captured under a backlight condition and modify the image as if it were a non-backlight image. In terms of automated retouching, it is necessary to determine before retouching whether the image to be retouched is a backlight image or a non-backlight image. A conventional image processing apparatus makes this determination by extracting feature quantity of the image and analyzing the feature quantity.

When the lightness correction is automatically applied for backlight image, proper lightness correction is unavailable if a determination is unsuccessfully made whether or not an image to be retouched is a backlight image.

SUMMARY OF THE INVENTION

It is therefore an object of the present invention to provide an image processing apparatus, an image processing method, an image processing program, and a medium recording the image processing program capable of accurately making a determination for backlight image.

In order to achieve the above-mentioned object, the present invention is configured to comprise: an image data acquisition unit for obtaining image data expressing an image in dot-matrix pixels; a luminance component acquisition unit for obtaining a luminance component for each pixel from the obtained image data; a distribution ratio calculation unit for dividing a value range applicable to luminance components into a plurality of ranges and calculating a distribution ratio of the number of pixels for luminance components included in each range to all pixels; a similarity determination unit for determining similarity between the distribution ratio in a predefined specific type of image and a distribution ratio calculated for the obtained image; and an image type determination unit for determining an image of the obtained image data to be the specific type when the similarity determination unit determines the similarity between the distribution ratios.

According to the above-mentioned configuration, the invention obtains a luminance component for each pixel from image data. Based on the luminance component, the invention determines a similarity between a specific type of image and the image for the obtained image data. That is to say, when the luminance component of the image for the obtained image data is similar to the luminance component of the specific type of image, it is determined that the image for the obtained image data complies with the specific type. For the similarity determination based on the luminance component, the invention considers distribution ratios of luminance components and compares similarities for the distribution ratios.

Various techniques are available for categorizing images into types. In consideration for image features, it is possible to define images having the feature to be the same type of images. In order to determine the type of image, the present invention analyzes feature quantity based on the image data. If it is determined whether or not there is similarity between the feature quantity for the specific type of image and the feature quantity for the obtained image data, it is possible to determine whether or not both are of the same type.

The present invention assumes an image's luminance component to be the feature quantity. Further, the present invention divides a value range applicable to luminance components into a plurality of ranges and compares distribution ratios for the ranges with each other to determine images with similar distributions to be the same type. Processes become complicated if luminance components are compared to determine the similarity for each gradation value of the luminance. However, it is possible to easily determine whether or not luminance distributions are similar to each other by dividing a value range applicable to luminance components into somewhat coherent ranges and comparing distribution ratios for the ranges.

Here, the luminance component acquisition unit just needs to obtain a luminance component for each pixel from the obtained image data. It is possible to adopt various techniques appropriate for the accuracy, the calculation speed, and the like requested for the image type determination. For example, when the image data is YCbCr (Y for luminance and CbCr for color differences) data containing luminance data for each pixel, it just needs to obtain the corresponding Y data for each pixel. When the image data is represented by color component gradation values such as RGB, it just needs to calculate a luminance component from the gradation value for each color component. Of course, the calculation may be accompanied by a weight operation that multiplies a specified coefficient and each gradation value of RGB. Each gradation value may be evenly added to find an average. Since the green component approximates a luminance component, only the green component may be used to calculate the luminance component.

The distribution ratio calculation unit just needs to be able to calculate a distribution ratio of luminance components for a plurality of ranges. It may be preferable to previously find the distribution of luminance components for all pixels and then divide a value range applicable to luminance components into a plurality of ranges to find the distribution ratio. Alternatively, it may be preferable to first divide a value range applicable to luminance components into a plurality of ranges, find the distribution for each range, and then find the ratio to all pixels. The similarity determination unit just needs to be able to determine the similarity between a distribution ratio in a specific type of image and a distribution ratio in the obtained image and thus can be variously configured.

The distribution ratio in a specific type of image may be determined in consideration for the distribution of characteristic luminance components in the specific type of image. That distribution ratio may be also determined statistically by previously calculating distribution ratios with respect to many images categorized into the specific type and averaging the calculated distribution ratios. It just needs to determine the similarity of distribution ratios for luminance components, making it possible to use various techniques to be described later. The image type determination unit determines that the image data belongs to the specific type based on the determination in the similarity determination unit. As a result, it becomes possible to automatically perform an image process needed for the specific type of data, perform an appropriate image process for each image, and the like.

As mentioned above, the present invention can easily determine image types by comparing luminances.

Since the present invention determines the similarity of distribution ratios, various image types can be determined by appropriately changing types of images to be used as one of objects to be compared. According to a preferred configuration example, a luminance histogram in the specific type of image shows a spike-shaped peak in a range that corresponds to a specified luminance or higher and contains the highest luminance. A large peak is contained in a range that corresponds to a specified luminance or lower. An intermediate luminance between these luminances provides the distribution count smaller than or equal to the specified value, showing the backlight image distribution.

In a backlight image, the rear of the main object is irradiated with light from an intense light source. The main object contains many low luminance components. There are many high luminance components outside the main object. Normally, the high luminance components show very large values. Since intense light is irradiated from the rear of the main object, many pixels in the image show the low or high lightness. Middle-lightness pixels are few. In many cases, the backlight image is characterized as follows. The luminance histogram shows a spike-shaped peak in a range that corresponds to a specified luminance or higher and contains the highest luminance. Large peaks are contained in a range that corresponds to the specified luminance or lower. An intermediate luminance between these luminances provides the distribution count smaller than or equal to the specified value.

When the image showing such histogram is assumed to be the specific type of image, the corresponding distribution ratio becomes characteristic of the backlight image. Therefore, the similarity determination unit can determine whether or not to identify the backlight image. Of course, it is not necessary to uniquely define shapes of the above-mentioned spike-shaped peak and large peaks, the specified luminance as a threshold value for these peaks, or an ideal value as the threshold value for the middle-luminance distribution count. As mentioned above, for example, it is possible to adopt the configuration that analyzes many backlight images, uses an average value as the threshold value, and determine a histogram for the specific type of image.

In this manner, it is possible to easily determine whether or not the image is a backlight image.

Further, the above-mentioned distribution ratio calculation unit may be configured to calculate a histogram for the calculated luminance components and divide a value range applicable to the luminance components into a plurality of ranges to calculate the distribution ratio for each range. The distribution ratio calculation unit just needs to calculate a distribution ratio for each range. For the sake of this calculation, the distribution ratio calculation unit calculates a histogram of luminance components for the image in advance. When the value range applicable to luminance components is divided into a plurality of ranges, it is possible to easily calculate the number of pixels included in each range. As a result, it is possible to calculate a distribution ratio of the number of pixels in each range to the total number of pixels.

Here, the distribution ratio calculation unit just needs to be able to divide the value range applicable to luminance components into a plurality of ranges so as to be able to compare similarities of distribution tendencies in luminance components. As a preferred example, the distribution ratio calculation unit may be configured to divide ranges so that approximately 90% of pixels in a backlight image as a specific type of image exist in the lowest-luminance range and its adjacent range and approximately 10% of pixels exist in the highest-luminance range.

As mentioned above, the backlight image presents the respective features for high, low, and intermediate luminance components. Therefore, it is preferable to divide the value range applicable to luminance components into a plurality of ranges so that these features are reflected. In the luminance histogram of the backlight image, as mentioned above, the high-luminance component shows a spike-shaped peak. The low-luminance component shows a smooth peak. Accordingly, the low-luminance component's peak is wider than the high luminance component's peak and exists over a wide range. It is requested that two ranges include a range featuring the low-luminance distribution and one range include a range featuring the high-luminance distribution. For this purpose, there is provided the configuration so that approximately 90% of pixels in a backlight image as a specific type of image exist in the lowest-luminance range and its adjacent range and approximately 10% of pixels exist in the highest-luminance range.

As a result, the distribution ratio can be defined so that the backlight image's feature can be reflected on two ranges at the low luminance, on one range at the high luminance, and on an intermediate range therebetween. It becomes possible to determine whether or not to identify the backlight image. The present invention determines the similarity of images and does not provide a strict threshold value for range division. However, the determination accuracy can be improved by dividing the range at least on the basis of the above-mentioned guideline. Actually, various techniques can be used for the range division in such a manner that the entire range of luminance components is evenly divided while satisfying the guideline for the range division.

Further, the above-mentioned lowest-luminance range in the specific type of image may have a larger distribution ratio than that for the adjacent range. That is to say, the backlight image provides a large distribution ratio for the low luminance. When two ranges for low luminances are compared with each other, more pixels tend to exist in a lower luminance side. When the distribution ratio needs to be determined for the specific type of image, it is preferable to set the distribution ratio for the lowest-luminance range to be larger than the distribution ratio for the adjacent range. This makes it possible to more accurately determine the backlight image.

Further, the distribution ratio calculation unit may be configured to almost evenly divide a value range applicable to luminance components into five ranges. The distribution ratio in the specific type of image may be set to 5:4:0:0:1 in order from a low-luminance side of the divided ranges. In other words, when the entire range of luminance components is divided into five portions, the luminance component range can be divided so that the distribution ratio for the backlight image becomes 5:4:0:0:1 in order from the low-luminance side. The range can be divided so that two ranges for low luminances include 90% of pixels and one range for the highest luminance includes 10% of pixels. The distribution ratio for the specific type of image is configured so as to set a ratio for the lowest-luminance range to "5" and a ratio for the adjacent range to "4". This makes it possible to comply with the tendency of the backlight image that a low-luminance side contains many pixels.

According to this configuration, the range can be divided in accordance with the backlight image property. It becomes possible to accurately determine the backlight image.

Moreover, the distribution ratio calculation unit may be also configured to almost evenly divide a value range applicable to luminance components into five ranges which are $4.7 \leq A \leq 5.8$, $3.3 \leq B \leq 4.0$, $0.0 \leq C \leq 0.3$, $0.0 \leq D \leq 0.2$, and $0.6 \leq E \leq 1.0$ (where $A+B+C+D+E=10$).

As mentioned above, the distribution ratio for the backlight image can be represented in the ratio of 5:4:0:0:1 in order from the low-luminance side. The ratio is not limited to these values in order to determine whether or not to identify the backlight image. A certain degree of range can be permitted for each of values A through E. According to experiments by the applicants, setting the values A through E to the above-mentioned range has made it possible to accurately determine whether or not to identify the backlight image. For example, the values A through E were experimentally set to "4.6:4.4:0:0:1" in order. This indicates that the type of image to be determined (image for the obtained image data) is apparently or should be assumed to be a backlight image. However, the similarity became small, and that type of image was not determined to be a backlight image.

That is to say, it is possible to provide the distribution ratio range capable of accurately determining the backlight image.

The similarity determination unit can be variously configured to provide techniques for determining the distribution ratio similarity. As an example, the similarity determination unit maybe configured to determine the similarity according to a value size which is found by dividing an inner product between a vector comprising a distribution ratio in the obtained image and a vector comprising a distribution ratio in the specific type of image by the product of both vector sizes.

That is to say, an inner product of vectors is divided by a product of the sizes of both vectors to yield a value. This value is a cos component for the angle formed between the vectors. If both vectors are the same, the cos component becomes "1". As both vectors are displaced from the same vector, the cos component is set to a value differing from "1". Accordingly, the similarity of both vectors can be determined by verifying in what degree the cos component approximates to "1".

Here, a vector is assumed to comprise the distribution ratio for each range. Therefore, the cos component can be used to determine the similarity of the distribution ratio. As a result, the image similarity can be determined. Even if the number of ranges becomes 2, 3, or larger, the vector can be assumed to be a multidimensional vector. The obtained value can be assumed to be a cos component between multidimensional vectors. The similarity can be determined on the basis of this cos component.

In this manner, the similarity of the distribution ratio can be easily determined in accordance with the similarity determination of vectors, making it possible to determine the image similarity.

Furthermore, the similarity determination unit may be configured to determine that distribution ratios are similar to each other when an obtained value is larger than a specified threshold value. That is to say, if the obtained value is "1", both ratios to be compared are the same. If the obtained value is not equal to but is approximate to "1", both are similar to each other. Here, the above-mentioned obtained value is found by dividing an inner product between a vector comprising a distribution ratio in the obtained image and a vector comprising a distribution ratio in the specific type of image by the product of both vector sizes. The similarity can be determined by determining whether or not the obtained value is larger than a specified threshold value. A specific threshold value can be appropriately changed in accordance with the requested determination accuracy, and the like.

Still further, the image type determination unit may be configured to divide an image for the obtained image data into a specified peripheral area and a specified inside area, calculate an average value of luminance components for pixels belonging to each area, and not to determine that the image corresponds to a specific type when an area causing the average value to be maximum corresponds to the specified inside area. A front-light image is generated by applying light from the front of the main object against a dark background. On such front-light image, a luminance histogram may distribute as follows. Like the backlight image, the luminance histogram shows a spike-shaped peak in a range that corresponds to a specified luminance or higher and contains the highest luminance. Large peaks are contained in a range that corresponds to the specified luminance or lower. An intermediate luminance between these luminances provides the distribution count smaller than or equal to the specified value. In this manner, the backlight image can be determined accurately.

In this case, a non-backlight image may not be distinguished from the backlight image. It may be preferable not to determine the front-light image to be a backlight image. In order to determine the front-light image that has the above-mentioned histogram, the image is divided into a specified peripheral area and a specified inside area. A luminance average is calculated for each area. When the inner area contains the maximum luminance average value, the image under inspection is not determined to be the specific type of image. That is to say, when the image is light at the center and dark at the periphery, the image is not determined to be a backlight image. Accordingly, it becomes possible to exclude front-light images whose luminance distribution is similar to that of the backlight image. The more accurate determination is available.

Here, various techniques can be used for the area division. The image needs to be divided into at least two areas: peripheral and inside areas. Of course, the image can be divided into more areas than two, e.g., into four peripheral areas and into nine inside areas. When the image is divided into two areas, finding the maximum luminance average signifies comparing luminance averages for the two areas.

As an example of excluding front-light images, the image type determination unit may be configured to make a negative value of a value found by dividing the inner product of the vectors in the similarity determination unit by the product of both vector sizes with respect to an image in which the area causing the average value to be maximum corresponds to the specified inside area. As mentioned above, the similarity becomes more apparent when the value obtained as the cos component more approximates to "1". The cos component is set to a negative value for the image whose specified inside area contains the maximum average value. In this manner, the image can be excluded from being determined to be the specific type of image. By setting the cos component to a negative value, the similarity determination algorithm just needs to always use only a given threshold value without using a special threshold value and the like for excluding front-light images.

Thus, the front-light image can be easily excluded.

As an example of more accurately determining whether or not to identify a specific type of image, the distribution ratio calculation unit may be configured to calculate the distribution ratio by correcting each pixel of the obtained image data so that a pixel whose luminance component is larger than a specified value produces a luminance component value larger than a luminance component of the pixel and a pixel whose luminance component is smaller than a specified value produces a luminance component value smaller than a luminance component of the pixel.

The present invention determines whether or not to identify the backlight image on the basis of the similarity of the luminance distribution. For this reason, the luminance components are set to be higher or lower as a whole. In order to still ascertain the backlight image, decreasing the threshold value can easily determine the specific type of image. However, decreasing the threshold value also increases the probability of determining a non-specific type of image to be the specific type of image. As a solution, the luminance component is corrected before the distribution ratio calculation in order to increase the probability of determining the specific type of image having biased luminance components to be the specific type without decreasing the threshold value.

When the pixel contains a luminance component that is larger than the specified value, the pixel's luminance component is corrected to a much larger luminance component value. When the pixel contains a luminance component that is smaller than the specified value, the pixel's luminance component is corrected to a much smaller luminance component value. Thus, the distribution of middle-luminance pixels decreases. The distribution of low- and high-luminance pixels increases. Consequently, the backlight image having biased luminance components is corrected to be approximate to the histogram of the backlight image against which the similarity is compared. The distribution ratio is calculated with respect to the corrected luminances. This correction allows a backlight image having biased luminance components to be determined as the backlight image, making it possible to more reliably determine the backlight image.

In this manner, it is possible to easily determine whether or not an overexposed or underexposed image is the backlight image.

The technique of determining an image type based on luminance components of the image is not limited to substantial apparatuses but also effective as the invention of methods. The above-mentioned image processing apparatus may be independently available or may be used as installed in a given device. Various embodiments are included as an idea of the invention. The present invention can be appropriately modified to be software or hardware.

When the idea of the invention is embodied as software of the image processing apparatus, the invention obviously exists on a recording medium storing the software and is used accordingly. Apparently, the recording medium may be a magnetic recording medium, a magnetic optical recording medium. The same concept can be exactly equally applied to any recording media that will be developed in the future.

The concept is undoubtedly equally applied to duplication stages such as primary and secondary duplicate copies. Unlike the above-mentioned media, a communication line may be used as a supply method. In such case, the communication line serves as a transmission medium for using the present invention.

Other and further objects, features and advantages of the invention will appear more fully from the following description.

BRIEF DESCRIPTION OF THE DRAWINGS

FIG. 7 shows an example of calculating a similarity;

DETAILED DESCRIPTION OF THE PREFERRED EMBODIMENTS

Figure 1:
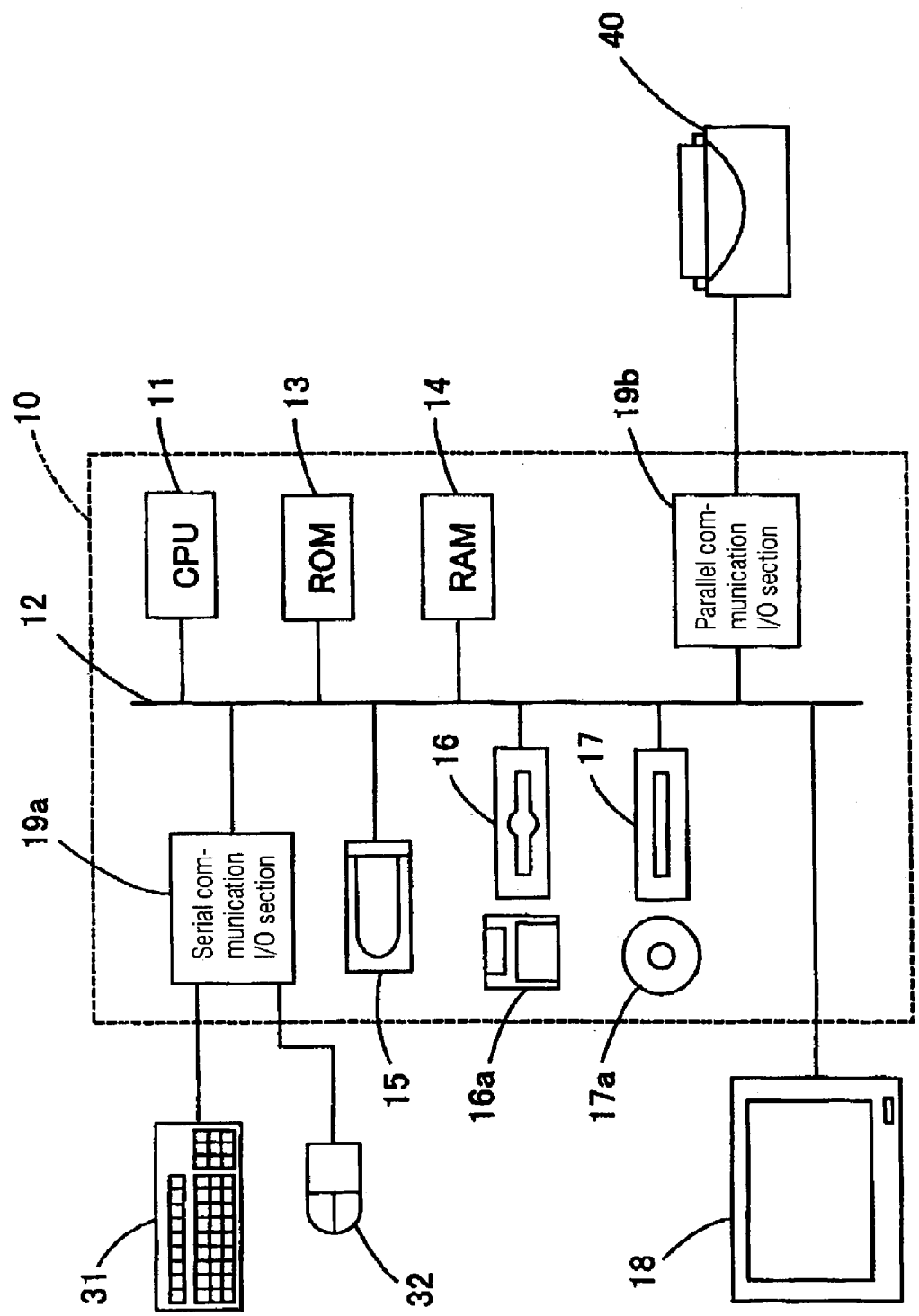
FIG. 1 outlines a hardware configuration of a computer including an image processing apparatus according to the present invention.
Figure 2:
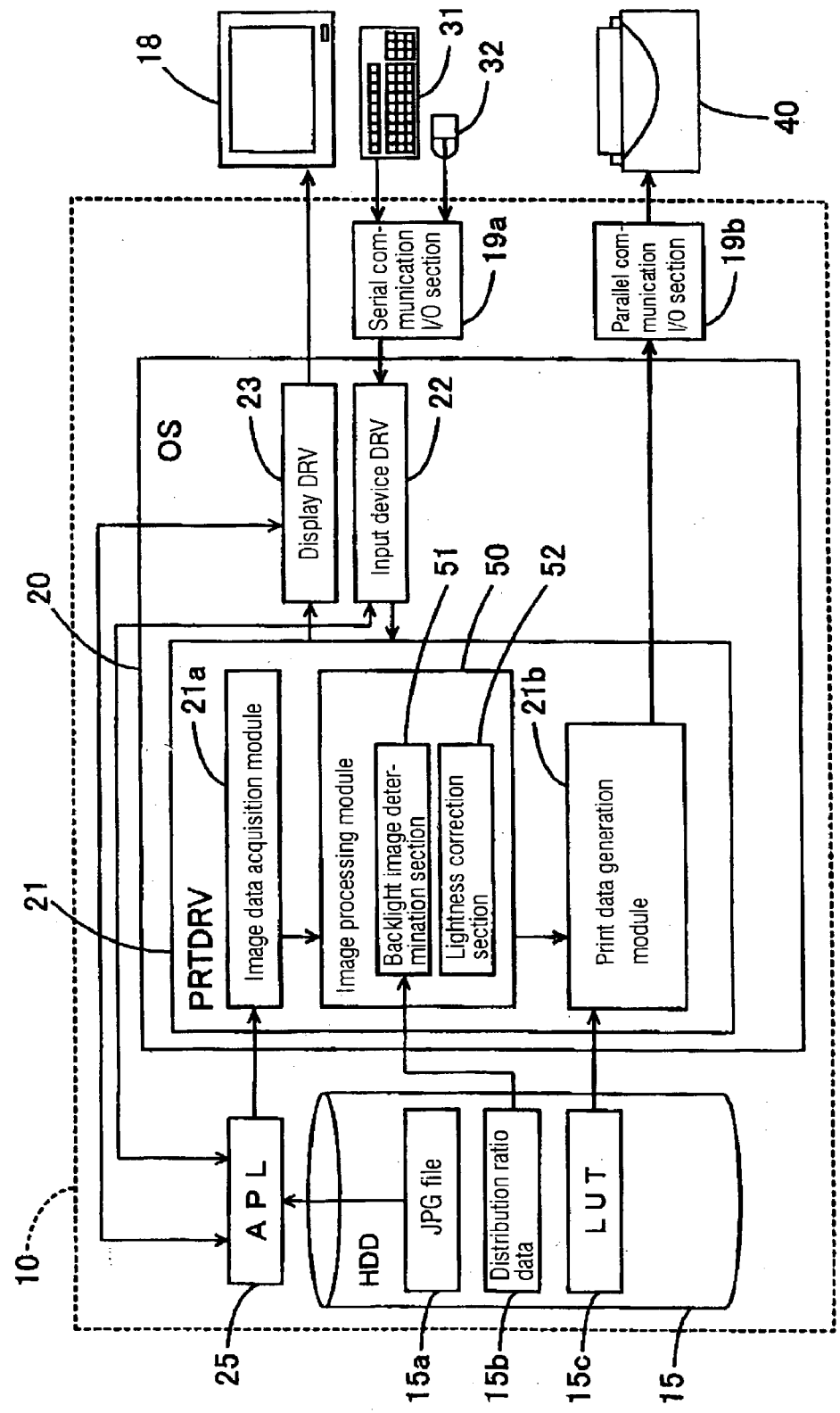
FIG. 2 outlines a configuration of a printer driver installed in an OS of the computer.

Embodiments of the present invention will be described as follows.
(1) Constitution of the present invention
(2) Configuration of the backlight image determination section
(3) Print process
(3-1) Similarity determination process
(4) Other embodiments
(1) Constitution of the Present Invention FIG. 1 outlines a hardware configuration of a computer including the image processing apparatus according to the present invention. FIG. 2 outlines a configuration of a printer driver installed in an OS of the computer. A computer 10 comprises a CPU 11 as a core of processing. The CPU 11 can access ROM 13 recording the BIOS and RAM 14 via a system bus 12.

The system bus 12 connects with a hard disk drive (HDD) 15, a flexible disk drive 16, and a CD-ROM drive 17 as external storages. An OS 20, an application program (APL) 25, and the like stored in the HDD 15 are transferred to the RAM 14. The CPU 11 accesses the ROM 13 and the RAM 14 to execute the software. That is to say, the RAM 14 is used as a temporary work area for executing various programs.

The computer 10 connects with input devices such as a keyboard 31 and a mouse 32 via a serial communication I/O section 19a. A display 18 is also connected to the computer 10 via a video board (not shown). The computer 10 can connect to a printer 40 via a parallel communication I/O section 19b. While the configuration of the computer 10 is simplified for description, it is possible to employ personal computers having the general configuration. Of course, the computer according to the present invention is not limited to personal computers. While the embodiment concerns a so-called desktop computer, it may be a notebook or mobile computer. The present invention is not limited to the above-mentioned connection interface between the computer 10 and the printer 40 and is also applicable to various connections such as a serial interface, SCSI, USB connections, and any other types of connections that may be developed in the future.

While the HDD 15 stores each program in this example, the recording medium is not limited thereto. For example, a flexible disk 16a or a CD-ROM 17a may be used for this purpose. The program recorded on the recording media is read into the computer 10 via the flexible disk drive 16 or the CD-ROM drive 17 and is installed on the HDD 15. The program is read into the RAM 14 from the HDD 15 to control the computer. The recording media are not limited thereto and may include a magnetic optical disk. As a semiconductor device, it is also possible to use nonvolatile memory such as a flash card. When a modem or a communication line is used to access external file servers for downloading, the communication line serves as a transmission medium to use the present invention.

As shown in FIG. 2, the computer 10 according to the embodiment includes the OS 20 installed with a printer driver (PRTDRV) 21, an input device driver (DRV) 22, and a display driver (DRV) 23. The display driver 23 controls display of image data and the like on the display 18. The input device driver 22 receives code signals from the keyboard 31 or the mouse 32 via the serial communication I/O section 19a and accepts specified input operations.

The application program APL 25 is capable of color image retouching. By executing the APL 25, a user can operate the input device to print a color image from the printer 40. In other words, the APL 25 reads a JPG file 15a recorded on the HDD 15 into the RAM 14 according to the user's instruction. The APL 25 then allows the display 18 to display an image based on the JPG file 15a via the display driver 23. When the user operates the input device, the operation contents are obtained and interpreted via the input device driver 22. In accordance with the operation contents, the APL 25 performs various processes such as printing and retouching.

The JPG file 15a comprises dot matrix data expressing YCbCr color components in gradations and complies with the JPEG standard. Of course, it is possible to use dot matrix data expressing sRGB standard RGB color components. The JPG file makes it possible to directly obtain luminance components from each pixel data. When data comprises RGB components, it is possible to obtain luminance components from each color component by means of calculation (e.g., $Y=0.30R+0.59G+0.11B$). The JPG file 15a is equivalent to, e.g., image data captured by a digital camera. The JPG file 15a can be transferred to the HDD 15 from the digital camera or other recording media via a specified interface. Alternatively, the JPG file 15a can be recorded on recording media such as the CD-ROM 17a and can be read from the CD-ROM drive 17.

The APL 25 issues a print command to activate the PRTDRV 21. The PRTDRV 21 sends data to the display DRV 23 to display a UI (not shown) such as a print page for entering information needed for printing. When the user operates the keyboard 31 or the mouse 32 to enter information needed for printing to the UI, each module of the PRTDRV 21 is activated. Each module processes pixel data in the JPG file 15a to generate print data. The generated print data is output to the printer 40 via the parallel communication I/O section 19b. The printer 40 performs printing based on the print data.

More specifically, the PRTDRV 21 comprises an image data acquisition module 21a, an image processing module 50, and a print data generation module 21b. The image data acquisition module 21a obtains pixel data from the JPG file 15a to be printed and passes the data to the image processing module 50. The image processing module 50 applies various image processes to the pixel data. The image processing module 50 obtains the pixel data's feature quantity and executes a type of image processing appropriate to an image for the feature quantity.

One of the image processes is lightness correction based on determination of a backlight image and its result according to the present invention. FIG. 2 particularly shows parts associated with the backlight image determination out of many image processes executable on the image processing module 50. The image processing module 50 comprises a backlight image determination section 51 and a lightness correction section 52 as corresponding parts. When the image processing module 50 processes an image, the processed pixel data is passed to the print data generation module 21b. The print data generation module 21b processes the pixel data into data that can be printed on the printer 40. The print data generation module 21b provides the following processes: color conversion to reference an LUT 15c stored in the HDD 15 and convert each pixel data into CMYK data and the like; halftoning to convert a gradation value of each pixel for representation in the recording density of ink droplets; and rasterization to arrange pixel data in the order of usage.

The backlight image determination section 51 extracts a luminance component as the feature quantity from data of pixels constituting the image. The backlight image determination section 51 then verifies the similarity between distribution ratios of the extracted luminance component and the backlight image's luminance component to determine whether or not the JPG file 15a provides a backlight image. If the JPG file 15 provides a backlight image, the lightness correction section 52 performs lightness correction for the backlight image. If the JPG file 15 provides no backlight image, the lightness correction section 52 performs the normal lightness correction. According to the embodiment, the PRTDRV 21 includes the image processing module 50 which further includes the backlight image determination section 51. In this manner, the computer 10 functions as the image processing apparatus according to the present invention. The backlight image determination section 51 will be discussed in more detail below.

(2) Configuration of the Backlight Image Determination Section

Figure 3:
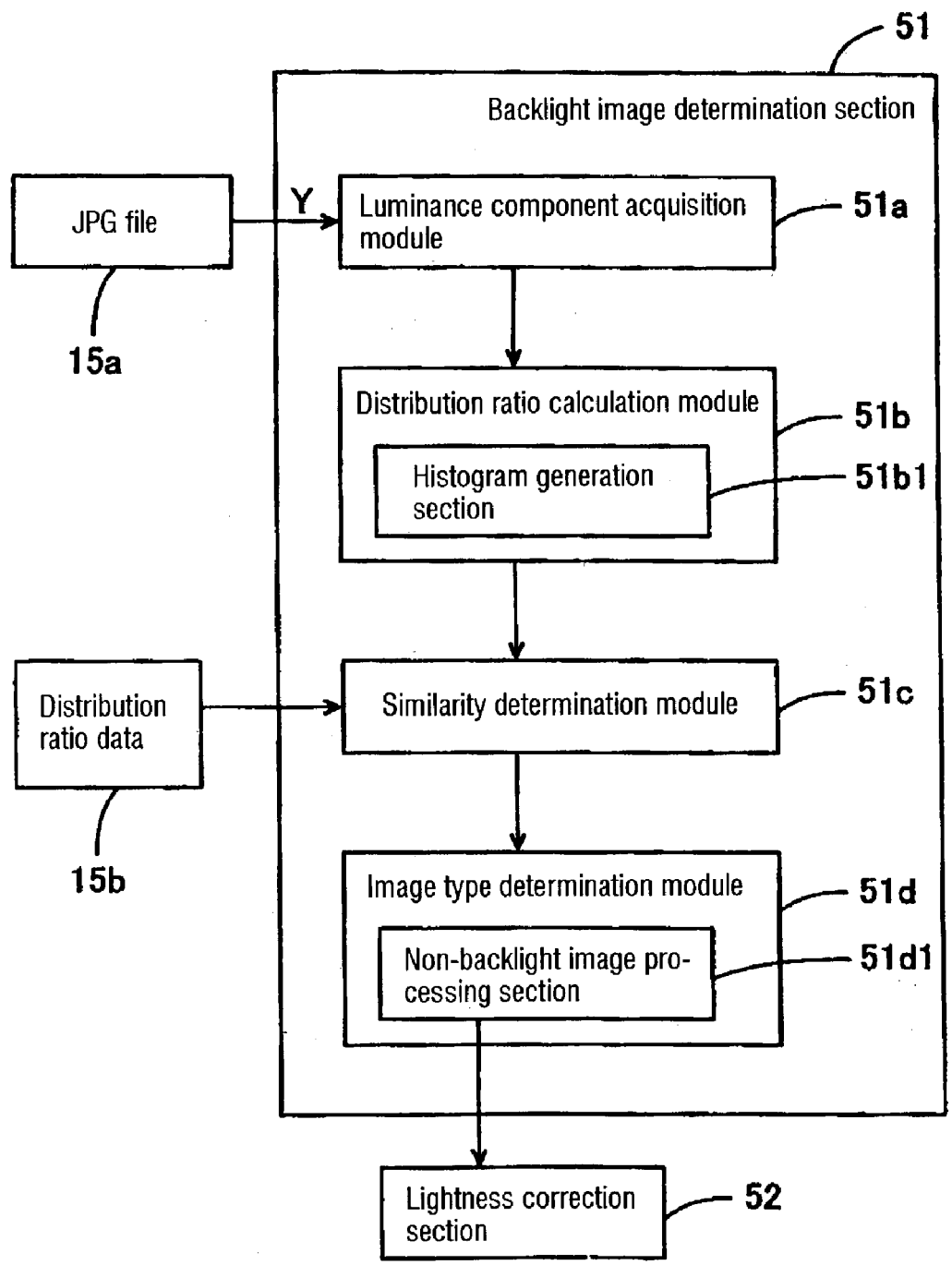
FIG. 3 is a block diagram showing a configuration of a backlight image determination section.
Figure 4:
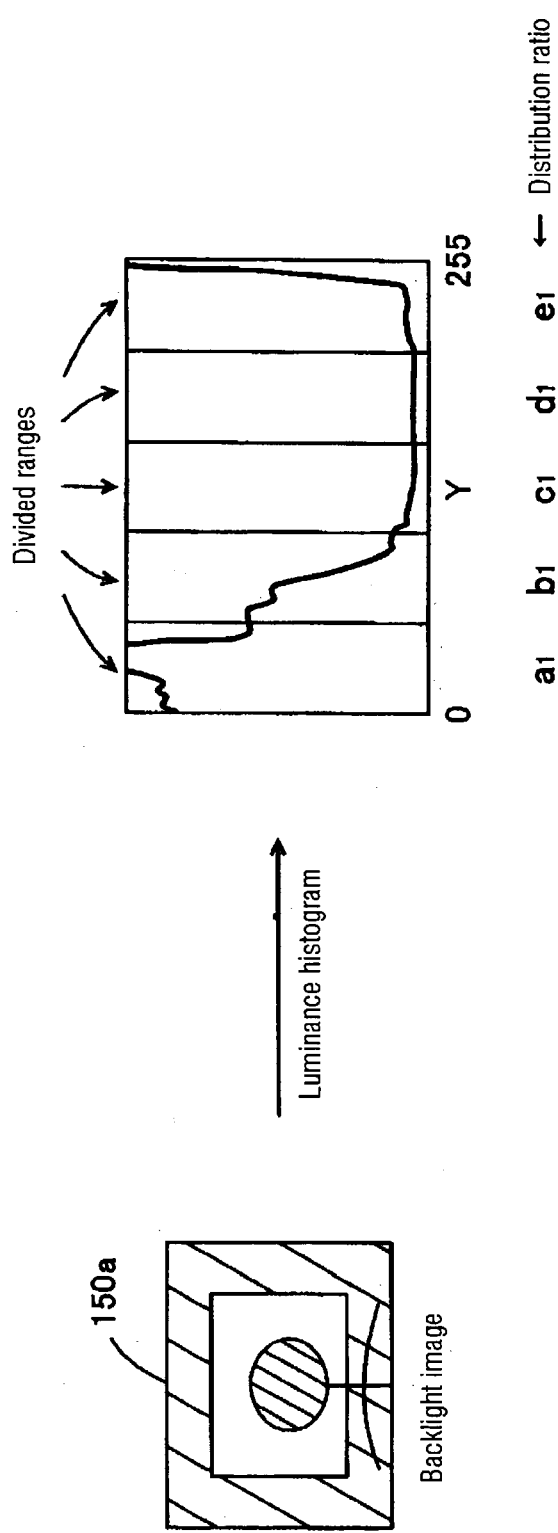
FIG. 4 illustrates processing for a backlight image.
Figure 5:
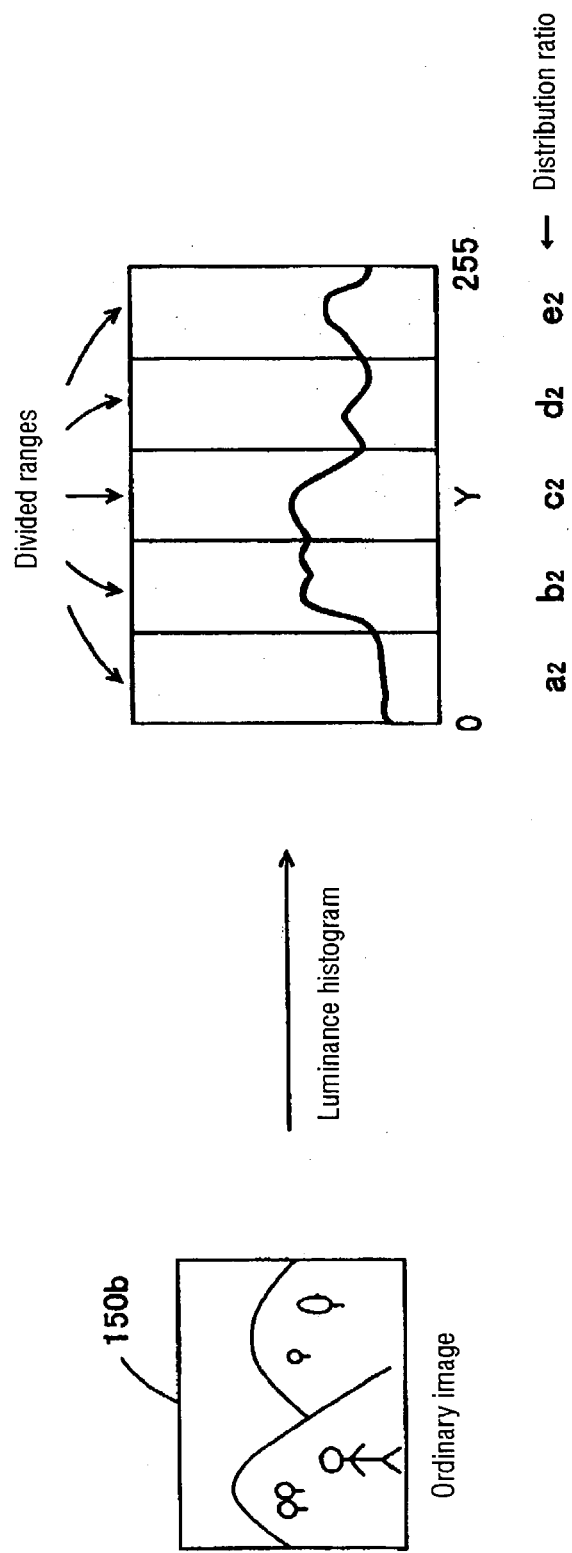
FIG. 5 illustrates processing for an ordinary image that is not a backlight image.

FIG. 3 is a block diagram showing a configuration of the backlight image determination section 51. FIG. 4 illustrates how the backlight image determination section 51 processes a backlight image. FIG. 5 illustrates how the backlight image determination section 51 processes an ordinary image that is not a backlight image. At the left of FIG. 4, there is shown a backlight image 150a. Its main subject is a person whose face is shaded together with an image periphery. This indicates that shaded portions contain low-luminance pixels. An unshaded portion near the center contains high-luminance pixels.

In this image, the light is irradiated from the rear of the person as the main subject to the front. The image becomes very luminous at portions where no light is blocked. The luminance is low at the main subject blocking the irradiated light and the image periphery. The image becomes a backlight image that causes an extreme luminance difference in the image and the low luminance at the main subject. At the left of FIG. 5, there is shown an ordinary image 150b that is not a backlight image. The ordinary image 150b is captured by photographing a person outdoors. The main light source is positioned in front of the subject which is illuminated in a front-light manner.

Here, the backlight image determination section 51 performs a process to calculate the similarity for the pixel data independently of whether or not the image is a backlight image. Based on the calculated similarity, the backlight image determination section 51 determines whether or not the image is a backlight image. For this purpose, as shown in FIG. 3, the backlight image determination section 51 comprises a luminance component acquisition module 51$a$, a distribution ratio calculation module 51$b$, a similarity determination module 51$c$, and an image type determination module 51$d$. The luminance component acquisition module 51$a$ obtains luminance component Y from pixel data in the JPG file 15$a$ the image data acquisition module 21$a$ obtains. As mentioned above, the embodiment can directly obtain luminance component Y without needing to modify pixel data.

The distribution ratio calculation module 51$b$ comprises a histogram generation section 51$b$1 to generate a histogram of luminance component Y for each pixel obtained by the luminance component acquisition module 51$a$. It may be preferable to generate a histogram for all pixels obtained by the luminance component acquisition module 51$a$ or for selected pixels out of all the pixels. When selecting pixels, it is desirable to determine the number of pixels that can reflect the property of all pixels in consideration of the statistical accuracy.

The process examples in FIGS. 4 and 5 present histograms in each of which the abscissa indicates a value of luminance component Y for each pixel and the ordinate indicates its distribution count. Further, the distribution ratio calculation module 51$b$ divides luminance component Y according to the histogram into five equal ranges and calculates a distribution ratio for each range. FIG. 4 shows distribution ratios a1, b1, c1, d1, and e1 for the backlight image 150$a$. FIG. 5 shows distribution ratios a2, b2, c2, d2, and e2 for the ordinary image 150$b$.

Here, the distribution ratios a1 through e1 and a2 through e2 are values found by dividing the number of pixels in each range by the number of all pixels. According to the embodiment, each luminance component supports an entire gradation range from 0 to 255. The above-mentioned divided range has a width approximately equivalent to 51 gradations. In the backlight image 150$a$ of FIG. 4, the main subject and the image periphery contain low luminous pixels as mentioned above. The other pixels are very highly luminous. Almost all pixels in the image are unevenly distributed to the low or high luminance. Generally, a backlight image contains too highly luminous portions. The histogram for the high-luminance side shows a spike-shaped peak which exits in one range for the highest luminance.

The low-luminance portion in the backlight image is subject to a change in the luminance depending on a position corresponding to the low-luminance portion in the image. In terms of the histogram, the low-luminance portion has wider peaks than the high-luminance portions. In FIG. 4, two ranges for the low luminance contain major pixels for the low-luminance portion. On the other hand, the histogram of luminance components for the ordinary image 150$b$ in FIG. 5 differs from the histogram distribution characteristic to the backlight image in FIG. 4. That is to say, luminance components of the ordinary image 150$b$ distribute in some degree across the entire range. If the maldistribution is found, it differs from that for the backlight image 150$a$ in FIG. 4.

At least, the ordinary image does not provide the histogram in which two ranges for the low luminance contain wide peaks; one range for the highest luminance contains the spike-shaped peak; and two ranges for the middle luminance show little distribution. When the histograms are observed according to these characteristics, there is a remarkable difference between a backlight image and the other ordinary images. The present invention uses such remarkable difference between luminance component distributions to determine whether or not the image is a backlight image. That is to say, it is determined whether or not an image under test for a backlight image shows a luminance histogram similar to the ideal luminance histogram distribution for the backlight image. For this purpose, the similarity determination module 51$c$ obtains a distribution ratio calculated by the distribution ratio calculation module 51$b$. The similarity determination module 51$c$ then obtains distribution ratio data 15$b$ to determine the similarity between the both.

In other words, the distribution ratio data 15$b$ is a distribution ratio found by dividing an ideal backlight image histogram into ranges in the same manner as the range division through the distribution ratio calculation module 51$b$ and dividing the number of pixels in each range by the number of all pixels. It is possible to determine whether or not the image under test is similar to the backlight image by comparing the distribution ratio for that image with the distribution ratio data 15$b$. The distribution ratio data 15$b$ according to the embodiment comprises "5:4:0:0:1" beginning from the range having a small luminance value. The embodiment calculates distribution ratios form any backlight images in advance in order to calculate an ideal backlight image distribution ratio. An ideal distribution ratio for each range is found by calculating an average of these distribution ratios.

Figure 6:
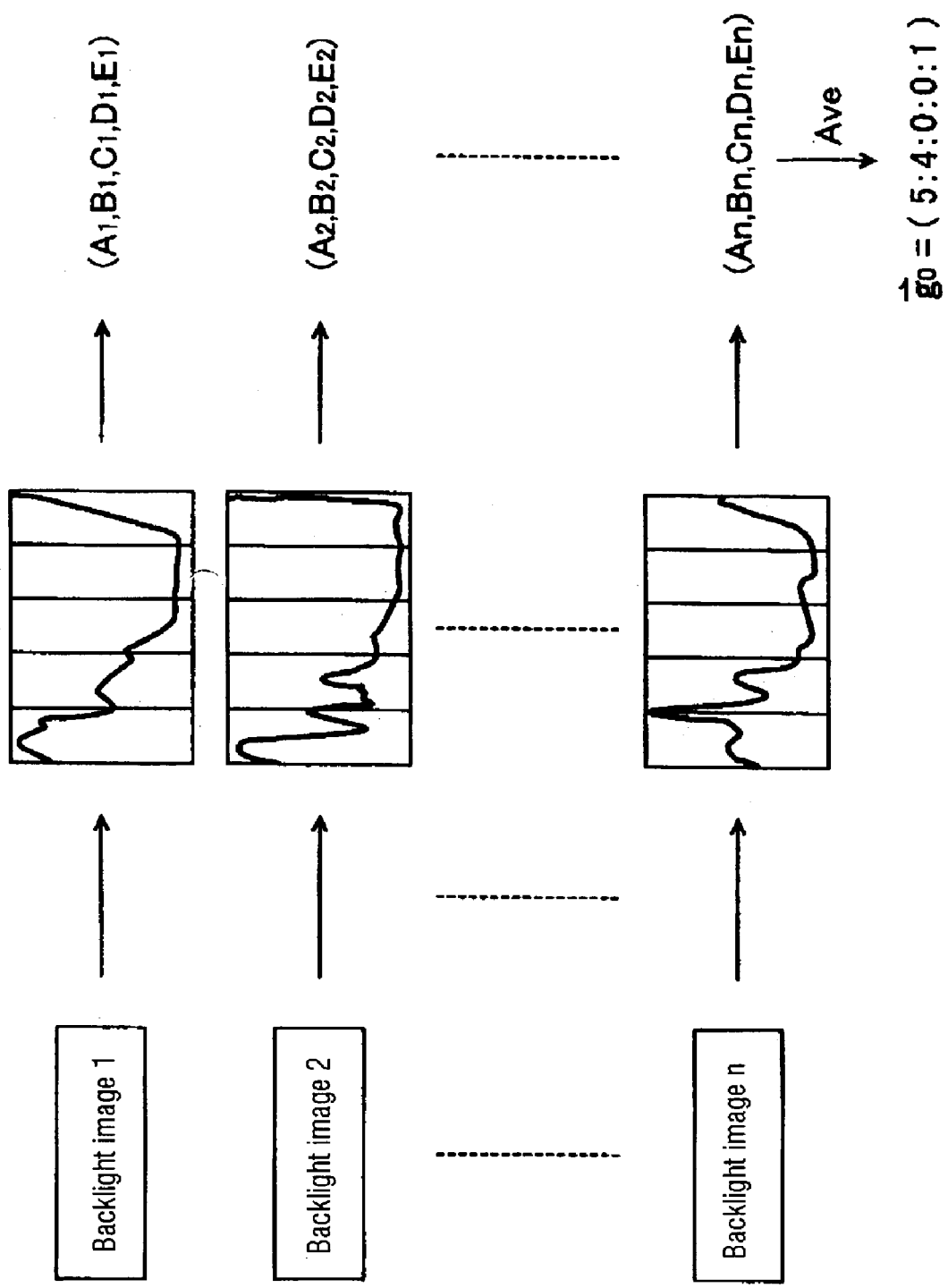
FIG. 6 illustrates calculation of an ideal distribution.

FIG. 6 illustrates how to calculate an ideal distribution. The examples in FIG. 6 calculate distribution ratios for the backlight images 1 through n. There are prepared n backlight images as samples. The histogram of luminance components is calculated for each of the backlight images 1 through n. Each histogram is evenly divided into five ranges as value ranges applicable to luminance components to calculate the distribution count for each range. The distribution count for each range is divided by the number of all pixels in each image to calculate distribution ratios Ai, Bi, Ci, Di, and Ei, where i ranges from 1 to n.

When an average is calculated for distribution ratios Ai, Bi, Ci, Di, and Ei with respect to each range, it is possible to calculate a distribution ratio for each range reflecting properties of the backlight images 1 through n. The embodiment uses this distribution ratio as the ideal distribution ratio. In addition, increasing the number of backlight images can improve the statistical accuracy for the distribution ratio data 15$b$. By appropriately selecting backlight images for the histogram analysis, it is possible to make a decision reflecting the creator's intention as to which image should be assumed to be a backlight image.

It is undefinitive whether or not the reverse backlight should be assumed to be a backlight image. The creator's intention can be reflected by creating the distribution ratio data 15$b$ resulting from preparation of many images the creator intends to be backlight images according to his or her sense. In this meaning, the above-mentioned distribution ratio is not limited to "5:4:0:0:1". It is possible to make an accurate determination as to whether the intended image is a backlight image simply by using an available range of values. According to the applicants' experiments, it is possible to accurately determine whether or not the image is a backlight image based on the distribution ratio A:B:C:D:E in order beginning from the low-luminance side within the ranges of $4.7 \leq A \leq 5.8$, $3.3 \leq B \leq 4.0$, $0.0 \leq C \leq 0.3$, $0.0 \leq D \leq 0.2$, $0.6 \leq E \leq 1.0$, where $A+B+C+D+E=10$.

The similarity determination module 51c verifies the similarity between a distribution ratio of luminance component Y for the above-mentioned JPG file 15a and a distribution ratio of the ideal distribution for the backlight image. To do this, the similarity determination module 51c uses 5-dimensional vectors comprising distribution ratio values and calculates a cos component in these 5-dimensional vectors based on the following equation (1).

$$\text{Similarity} = \cos\theta = \frac{\vec{g_0} \cdot \vec{g_n}}{|\vec{g_0}||\vec{g_n}|} \quad \text{[Equation 1]}$$

Here, vector g0 comprises the distribution ratio for the distribution ratio data 15b. The component values are (5, 4, 0, 0, 1). Vector gn comprises the distribution ratio calculated by the distribution ratio calculation module 51b. The right side of equation (1) expresses the inner product of the two vectors divided by the product of two vector sizes. The equation is used to calculate a cos component of two vectors. It is not easy to recognize, as spatial images, cos components in the 5-dimensional space or angle θ formed by both vectors. Here, a value calculated from equation (1) is assumed to be a cos component on the similar analogy of 2- or 3-dimensional vectors.

Cos components in two vectors take a maximum value of "1" and a minimum value of "−1". The maximum value "1" results when a match is found between angles formed by both vectors. As the angle increases, the cos component deviates from "1". Accordingly, the similarity between both vectors can be determined by determining whether or not a calculation result of equation (1) approximates to "1". In this meaning, it is possible to say that the value of equation (1) indicates the similarity between both the vectors.

FIG. 7 shows examples of calculating similarities. In FIG. 7, vector g1 comprises distribution ratios a1 through e1 for the backlight image 150a in FIG. 4. Vector g2 comprises distribution ratios a2 through e2 for the ordinary image 150b in FIG. 5. When each vector is substituted for vector gn in the equation (1), the similarity for the backlight image 150a becomes, e.g., "0.91" and the similarity for the ordinary image 150b becomes, e.g., "0.62".

The image type determination module 51d obtains the similarity determined by the similarity determination module 51c. If the similarity exceeds a specified threshold value, the image type determination module 51d determines that the image for the JPG file 15a is a backlight image. The embodiment uses the threshold value of "0.85" for determining a backlight image. Accordingly, in the examples of FIGS. 4, 5, and 7, the backlight image 150a is determined to be a backlight image. The ordinary image 150b is not determined to be a backlight image. Of course, the threshold value can be changed appropriately according to an accuracy to determine a backlight image and the like. In order to improve the determination accuracy for a backlight image, the embodiment is configured so that an ordinary image similar to the distribution ratio of the backlight image is not determined to be a backlight image according to a process of the non-backlight image processing section 51d1.

Figure 8:
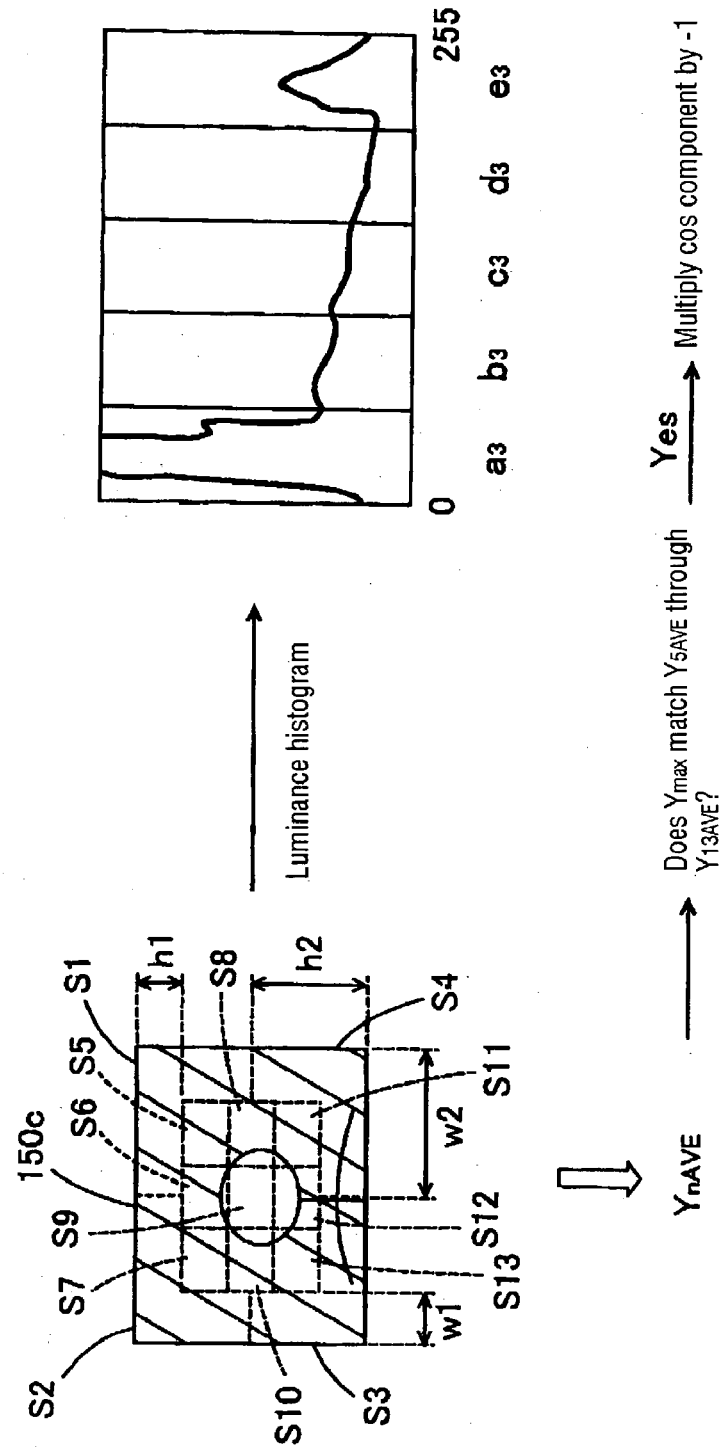
FIG. 8 explains processing in the non-backlight image processing section.

FIG. 8 illustrates processes of the non-backlight image processing section 51d1. FIG. 8 shows that the main subject of a non-backlight image 150c is a person; a shaded portion around the person comprises low-luminance pixels; and an outline corresponding to the person's face comprises high-luminance pixels. In this image, sufficient light is irradiated to the face of the person as the main subject and the main subject's face comprises high-luminance pixels. The face is surrounded by low-luminance pixels. Although the image contains large luminance differences depending on positions, the main subject has a large luminance and therefore is not a backlight image. Such situation often occurs when a photo is taken with flash in a dark place.

FIG. 8 also shows a luminance histogram of the non-backlight image 150c. The luminance histogram shows that many pixels in the non-backlight image 150c distribute to the low-luminance and high-luminance sides. Let us assume that distribution ratios a3, b3, c3, d3, and e3 are calculated for the image having such histogram. When the similarity determination module 51c determines a similarity, the cos component indicating the similarity may be greater than "0.85".

If the image is determined to be a backlight image, the lightness correction section 52 cannot perform a proper lightness correction. To solve this, the non-backlight image processing section 51d1 in the image type determination module 51d is configured not to determine such image to be a backlight image. More specifically, the non-backlight image 150c is divided into four areas S1 through S4. Each area is further divided into nine areas S5 through S13. With respect to the luminance component of each pixel obtained by the luminance component acquisition module 51a, luminance average YnAVE is calculated for each area, where n is a natural number corresponding to each area number.

According to the above-mentioned image division, there is a distance of h1 (=the shorter side of the image divided by 5) between the longer side of the areas S5 through S7 and the longer side of the image, and there is a distance of w1 (=the longer side of the image divided by 5) between the left shorter side of the areas S7, S10, and S13 and the left shorter side of the image. A boundary between the areas S1 and S4 is positioned to the center of the shorter side of the image, i.e., h2=the shorter side of the image divided by 2. A boundary between the areas S3 and S4 is positioned to the center of the longer side of the image, i.e., w2=the longer side of the image divided by 2. The areas S1 through S4 are congruent with each other. The areas S5 through S13 are congruent with each other.

After the image is divided and luminance average YnAVE is calculated for each area, maximum value Ymax is extracted from these YnAVE. It is determined which of the areas S5 through S13 corresponds to the maximum value Ymax. That is to say, it is determined whether or not an area corresponding to the maximum value Ymax belongs to the inside of the image. When any of the areas S5 through S13 corresponds to the maximum value Ymax, the similarity determined by the similarity determination module 51c is multiplied by "−1".

Since the distribution ratio calculated by the similarity determination module 51c is always a positive number, each component of the vector used for calculation of the above-mentioned equation (1) is also a positive number. Accordingly, the similarity calculated by the similarity determination module 51c is always a positive number. When the non-backlight image processing section 51d1 multiplies a result by "−1", the result becomes always a negative number. Consequently, when the image type determination module uses the above-mentioned threshold value for determination, there is no possibility of determining the image to be a backlight image. When a high-luminance area exists at any position near the center of the image, the above-mentioned process can prevent the image from being determined to be a backlight image.

FIG. 7 also shows a process example for the non-backlight image 150c in FIG. 8. When processing the non-backlight image 150c according to the equation (1), the similarity determination module 51c substitutes vector g3 comprising distribution ratios a3 through d3 in FIG. 8 for vector gn in the equation (1) to calculate the similarity to be "0.88". However, the non-backlight image processing section 51d1 processes the non-backlight image 150c to calculate the similarity to be "−0.88". Accordingly, the image type determination module 51d determines the similarity to be smaller than the threshold value "0.85" during the determination using the threshold value and does not determine that the image is a backlight image.

The non-backlight image processing section 51d1 according to the embodiment assumes that the main subject normally exists near the center of the image. When the main subject has a high luminance, the image is assumed to be a backlight image. Based on this assumption, the non-backlight image processing section 51d1 does not determine that the image is a backlight image. By performing this non-backlight process, it is possible to improve the determination accuracy for the backlight image in the image type determination module 51d. Of course, the present invention is not limited to the embodiment with respect to the algorithm of the non-backlight image processing section 51d1 to determine non-backlight images. It is possible to use the other algorithms independently or in combination with the algorithm according to the embodiment.

For example, it is not always necessary to divide the image into four peripheral areas and nine areas therein as mentioned above. It is also possible to configure the areas S1 through S4 to be a single area and configure the areas S5 through S13 to be a single area to divide the entire image into two areas, i.e., peripheral and center areas. In this case, a luminance average for each area is calculated and both luminance averages are compared with each other. When the luminance average for the center area is larger than that for the peripheral area, it just needs to multiply "−1" and the similarity determined by the similarity determination module 51c together.

Further, the present invention is not limited to the configuration in which the image type determination module 51d multiplies the cos component by "−1". The other configurations are available. For example, the luminance component acquisition module 51a obtains a luminance component and, at this point, makes a determination for non-backlight images. If a non-backlight image is detected, no process takes place in the distribution ratio calculation module 51b, the similarity determination module 51c, and the image type determination module 51d.

(3) Print Process

Figure 9:
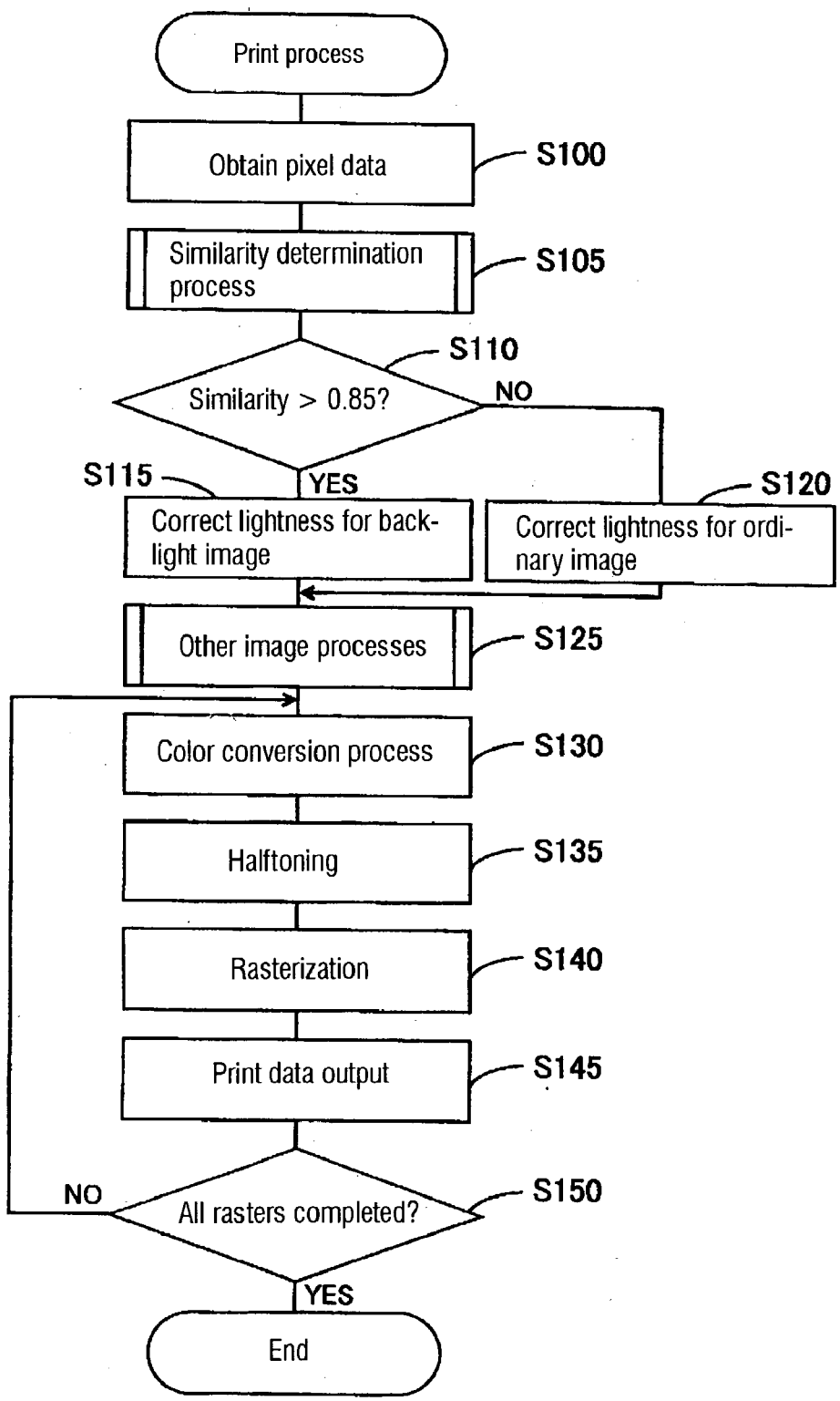
FIG. 9 is a flowchart for print processing.

The following uses a flowchart to describe a sequence of processes the PRTDRV 21 performs when the APL 25 prints an image in the JPG file 15a. FIG. 9 is a flowchart showing a process executed by the PRTDRV 21. The APL 25 issues a command to print an image in the JPG file 15a. Necessary parameters are entered to a UI (not shown). Then, the image data acquisition module 21a in the PRTDRV 21 obtains the associated pixel data from the JPG file 15a at step S100.

When the image data acquisition module 21a obtains the pixel data, the backlight image determination section 51 of the image processing module 50 executes the similarity determination process at step S105 to determine the similarity based on the equation (1). When the similarity is determined, the backlight image determination section 51 further determines at step S110 whether or not the similarity is greater than "0.85". After the determination at step S110, the lightness correction section 52 is activated. If the similarity is determined to be greater than "0.85" at step S110, the image in the JPG file 15a is determined to be a backlight image. The lightness correction section 52 executes the lightness correction for the backlight image at step S115.

The lightness correction for the backlight image changes the luminance for low-luminance portions in the image and lightens them to correct the backlight image as if it were a front-light image. This lightness correction can employ various known algorithms such as the gamma correction. At this time, parameter γ is calculated using a luminance average value for an ideal front-light image and a luminance average value for the image in the JPG file 15a. Thus, it is possible to apply the lightness correction so as to approach the luminance distribution of the front-light image. If it is not determined at step S110 that the similarity is greater than "0.85", the lightness correction for an ordinary image is performed at step S120. The lightness correction for ordinary images can also use various algorithms such as the gamma correction.

At step S125, the image processing module 50 further performs the other image processes (not shown). These processes can include, for example, the color balance adjustment, the white balance adjustment, and the like. Obviously, step S125 may precede the backlight image determination and the lightness correction according to the present invention. According to the embodiment, the LUT 15c is a table that maintains correspondence between RGB and CMYK data. The JPG file 15a contains data representing each element of YCbCr in gradations. Accordingly, the process at step S125 also converts the YCbCr data into the RGB data.

Of course, the APL 25 may convert the YCbCr into the RGB data. Such conversion may be omitted by using an LUT that maintains correspondence between the YCbCr and the RGB data. When the image process at step S125 is complete, the print data generation module 21b is activated to perform color conversion at step S130. When pixel data is converted from the YCbCr data into the RGB data, the print data generation module 21b further converts the pixel data into CMYK data to be used on the printer 40.

At step S135, a color according to the CMYK gradation value for each pixel is converted into the recording density of an ink droplet corresponding to each color. Head drive data is generated to apply the ink to a printout medium at the recording density. At step S140, the rasterization is performed to sort the head drive data in the order it is used for the printer. At step S145, the rasterized data is appended with specified information such as the image resolution to create print data. The print data is output to the printer via the parallel communication I/O section 19b. At step S150, it is determined whether or not the process at steps S130 through 145 is complete for all rasters constituting the image in the JPG file. The process at and after step S130 is repeated until the process is complete for all the rasters. As a result, the printer 40 prints the image in the JPG file 15a based on the print data.

(3-1) Similarity Determination Process

Figure 10:
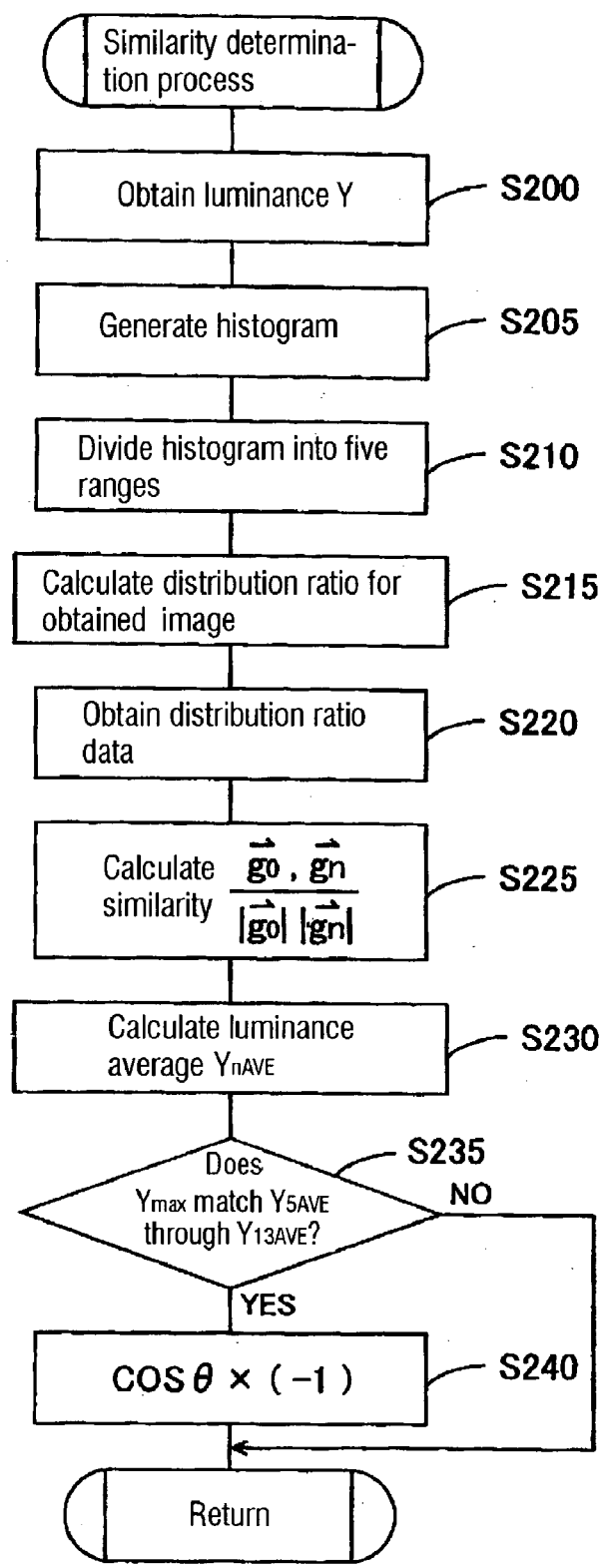
FIG. 10 is a flowchart for similarity determination.

The similarity determination process at step S105 will now be described with reference to the flowchart in FIG. 10. At step S200, the luminance component acquisition module 51a of the backlight image determination section 51 obtains luminance component Y from pixel data in the JPG file 15a. At step S205, the histogram generation section 51b1 of the distribution ratio calculation module 51b generates a histogram from the obtained luminance component Y for each pixel. At step S210, the luminance range of the histogram is evenly divided into five portions. At step S215, the distribution ratio calculation module 51b calculates a distribution ratio for each of the divided ranges.

At step S220, the similarity determination module 51c obtains the distribution ratio data 15b from the HDD 15. At step S225, the equation (1) is assigned with vector g0 based on the distribution ratio data 15b and vector gn based on the distribution ratio data calculated at step S215 to calculate the similarity. At steps S230 to S240, the non-backlight image processing section 51d1 performs the process. At step S230, the non-backlight image processing section 51d1 divides the image in the JPG file into the areas S1 through S13 and calculates luminance average YnAVE for each area.

At step S235, the non-backlight image processing section 51d1 determines whether or not the maximum luminance average Ymax matches luminance averages Y5AVE through Y13AVE. If it is determined at step S235 that Ymax matches any of the luminance averages Y5AVE through Y13AVE, the non-backlight image processing section 51d1 multiplies the calculated similarity (cos component) by "−1". If it is not determined at step S235 that Ymax matches any of the luminance averages Y5AVE through Y13AVE, step S240 is skipped.

If the image in the JPG file 15a is a backlight image according to the above-mentioned process, the similarity becomes greater than 0.85. If the image is an ordinary image, the similarity does not become greater than 0.85. If the image has a large average luminance at its center and is determined to be affirmative at step S235, the similarity becomes a negative number and is not greater than 0.85. If the image in the JPG file 15a is determined to be a backlight image according to the determination at step S110, the lightness correction for the backlight image is performed at step S115. If the image is determined to be an ordinary image or a non-backlight image determined to be affirmative at step S235, the lightness correction for the ordinary image is performed at step S120.

(4) Other Embodiments

A non-backlight image needs to be excluded in order to determine whether or not the image is a backlight image. For this purpose, the embodiment calculates average luminances for the peripheral area and the center area to add the process for incorporating luminance distributions according to image positions. Moreover, it is possible to add various processes to improve the determination accuracy. For example, an image captured by a digital camera is subject to maldistribution of luminances to the high or low luminance side depending on a length of the exposure time. It is also effective to provide preprocessing for decreasing effects of the maldistributed luminance.

Figure 11:
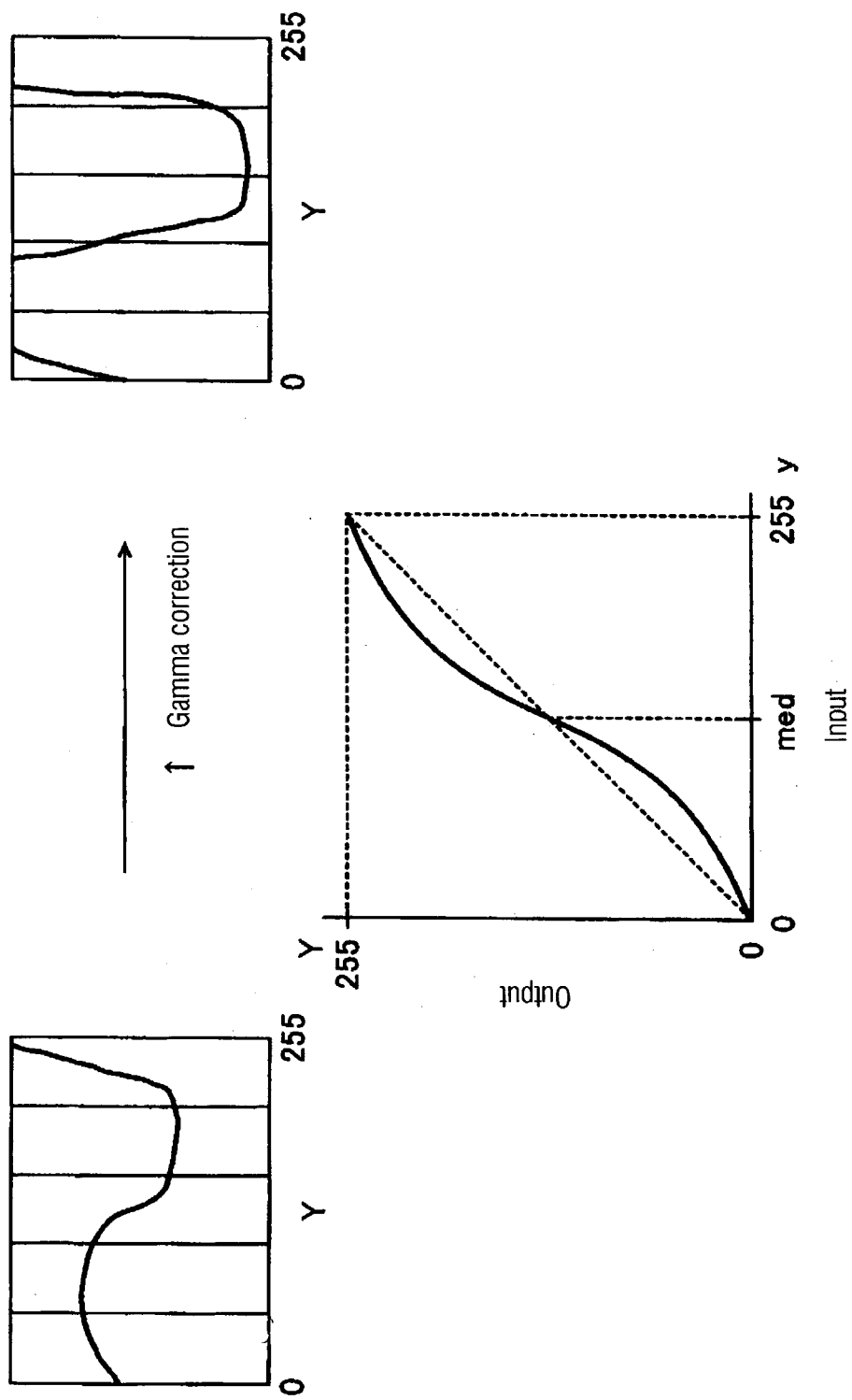
FIG. 11 explains a gamma correction.

FIG. 11 illustrates the configuration for improving the determination probability of being a backlight image by using the gamma correction to correct an overexposed image. The hardware according to the embodiment can be configured as shown in FIG. 1 in the same manner as for the first embodiment. There is provided preprocessing for the similarity determination. It is possible to employ, for example, a configuration that allows the distribution ratio calculation module 51b to perform this determination process. On the left of FIG. 11, there is shown a histogram of a backlight image whose all pixels are subject to a high luminance due to overexposure.

While the histogram shows a tendency similar to that of the histogram for the backlight image, there are many high-luminance pixels in total. The determination using the equation (1) may indicate no similarity between the distribution ratio of this image and the distribution ratio data 15b. When the gamma correction is applied to this pixel data, it is possible to make a determination for backlight image without changing the processes in the similarity determination module 51c and the image type determination module 51d.

As shown at the center in FIG. 11, the gamma correction applies correction indicated with a gamma curve to input data and outputs the corrected data. If the correction conforms to the dotted line of the graph shown at the center of FIG. 11, an input is the same as an output and no change occurs in the pixel data. If the correction follows a curve having a value smaller than the value indicated by the dotted line, it is possible to correct an input luminance to the low luminance side. If the correction follows a curve having a value larger than the value indicated by the dotted line, it is possible to correct an input luminance to the high luminance side.

When the correction uses the gamma curve as shown with the solid line of the graph at the center in FIG. 11, it is possible to correct pixel data in an intermediate-lightness area to the high luminance and the low luminance. When the luminance is smaller than the medium value med for input luminance, the input value can be corrected to a smaller value. When the luminance is larger than the medium value med, the input value can be corrected to a larger value. When the correction using this gamma curve is made to an image having the histogram on the left in FIG. 11, the pixel data can be corrected to conform to the histogram on the right in FIG. 11.

As a result, it is possible to obtain the histogram in which many pixels distribute in two ranges for the high luminance; some pixels distribute in one range for the highest luminance; and few pixels distribute in two center ranges. The probability of determination for a backlight image increases by performing the determination for this histogram according to the similarity determination module 51c and the image type determination module 51d. The above-mentioned process distributes middle-luminance pixels to the low luminance and the high luminance to approximate to the distribution for a backlight image. Of course, the similar gamma correction can be applied to not only overexposed images as mentioned above, but also underexposed images to approximate to the luminance distribution for a backlight image. It is possible to increase the probability of determination for a backlight image.

It is preferable that the distribution ratio calculation module 51b performs such gamma correction as preprocessing for the similarity determination. Various guidelines can be used as a basis for determining whether or not to perform the gamma correction, providing the following available configurations. For example, a luminance average for all pixels is calculated. The overexposure is assumed when the luminance average is larger than a predefined first threshold value. The underexposure is assumed when the luminance average is smaller than a predefined second threshold value. The gamma correction can be performed according to this condition. Alternatively, a user is permitted to select whether or not to perform the correction. Based on this selection, the gamma correction can be performed.

Figure 12:
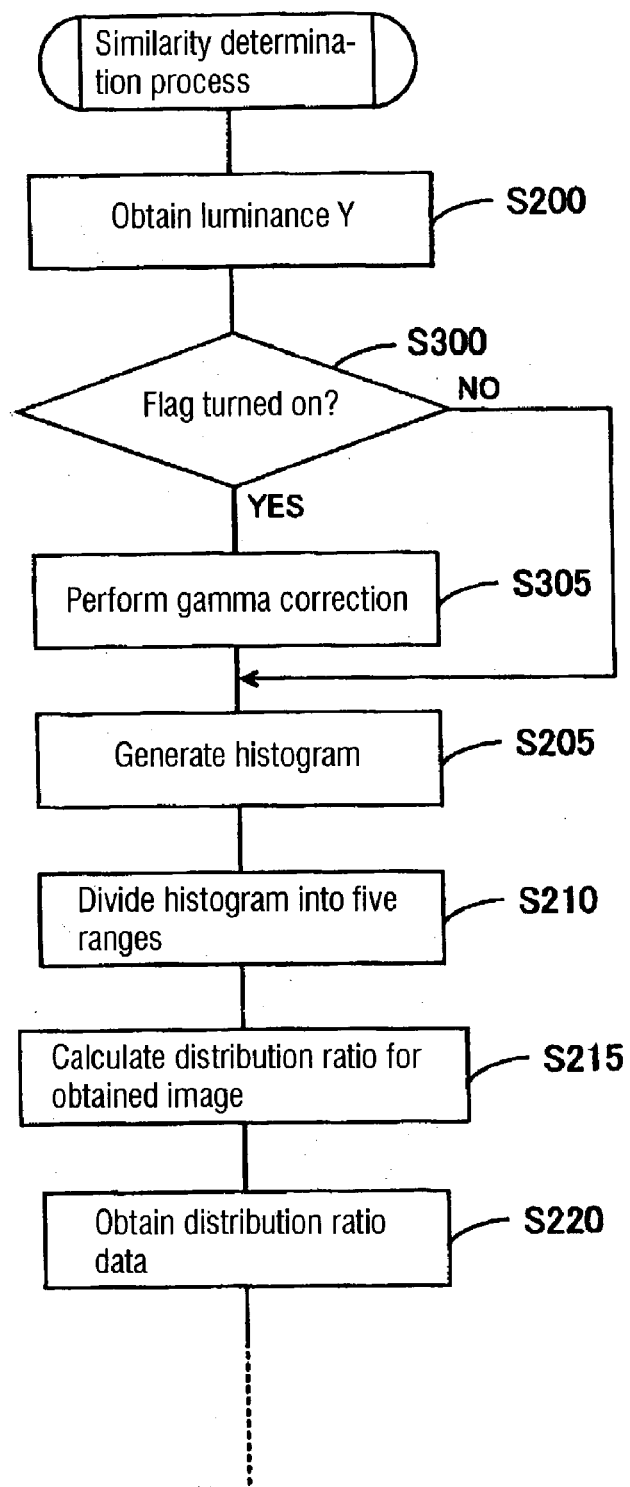
FIG. 12 is a flowchart for similarity determination.

FIG. 12 shows a process attributed to the distribution ratio calculation module 51b in the similarity determination process performed when the latter configuration is used. With reference to FIG. 12, in which steps similar to those previously described with reference to the flowchart in FIG. 10 are denoted by the same reference numerals or are omitted.

The embodiment allows a user to select whether or not to perform the gamma correction by using a UI (not shown) for entering information needed for the printing. The UI shows, e.g., a radio button along with an indication such as "backlight correction after exposure adjustment". Checking the radio button turns on a flag indicating execution of the gamma correction.

When the distribution ratio calculation module 51b performs the process in FIG. 12 according to this configuration, the process obtains luminance component Y from pixel data in the JPG file 15a at step S200. At step S300, it is determined whether or not the flag is turned on. If it is determined at step S300 that the flag is turned on, the gamma correction shown at the center in FIG. 11 is performed for luminance component Y obtained at step S305. If it is not determined at step S300 that the flag is turned on, step S305 is skipped.

At step S205, a histogram is generated for luminance component Y. If the gamma correction is performed at step S305, the luminance histogram on the left of FIG. 11 becomes the luminance histogram on the right thereof. Accordingly, the gamma correction approximates the vectors comprising distribution ratios in the respective ranges to vector g0 in FIG. 6. When an overexposure or underexposure occurs in the image photographed under the backlight condition, the process at and after step S210 increases the probability of determining that the image is a backlight image.

According to the present invention, as mentioned above, a distribution ratio for luminance components is obtained from a type of image to be determined. It is determined whether or not the similarity is found between that distribution ratio and a distribution ratio for the specific type of image. When the similarity is acknowledged, it is determined that the image under inspection complies with the specific type. When a distribution ratio for backlight image is obtained in advance as the distribution ratio for the specific type of image, the above-mentioned determination process makes it possible to accurately determine whether or not the image under inspection is a backlight image.

The foregoing invention has been described in terms of preferred embodiments. However, those skilled, in the art will recognize that many variations of such embodiments exist. Such variations are intended to be within the scope of the present invention and the appended claims.

What is claimed is:

1. An image processing apparatus comprising:
   an image data acquisition unit for obtaining image data expressing an image in dot-matrix pixels;
   a luminance component acquisition unit for obtaining a luminance component for each pixel from the obtained image data;
   a distribution ratio calculation unit for dividing a value range applicable to luminance components into a plurality of ranges and calculating a distribution ratio of the number of pixels for luminance components included in each range to all pixels;
   a similarity determination unit for determining similarity between the distribution ratio in a predefined specific type of image and a distribution ratio calculated for the obtained image; and
   an image type determination unit for determining an image of the obtained image data to be the specific type when the similarity determination unit determines the similarity between the distribution ratios.

2. An image processing method comprising:
   an image data acquisition step of obtaining image data expressing an image in dot-matrix pixels;
   a luminance component acquisition step of obtaining a luminance component for each pixel from the obtained image data;
   a distribution ratio calculation step of dividing a value range applicable to luminance components into a plurality of ranges and calculating a distribution ratio of the number of pixels for luminance components included in each range to all pixels;
   a similarity determination step of determining similarity between the distribution ratio in a predefined specific type of image and a distribution ratio calculated for the obtained image; and
   an image type determination step of determining an image of the obtained image data to be the specific type when the similarity determination step determines the similarity between the distribution ratios.

3. The image processing method according to claim 2, wherein a luminance histogram for a specific type of image exceeds a specified luminance; a spike-shaped peak belongs to a range including the highest luminance; a large peak belongs to a range including a specified luminance or lower; and a distribution count is smaller than or equal to a specified value at a luminance intermediate between these luminances to indicate a distribution of a backlight image.

4. The image processing method according to claim 2, wherein the distribution ratio calculation step calculates a histogram of the calculated luminance components and divides a value range applicable to the luminance components into a plurality of ranges to calculate a distribution ratio for each range.

5. The image processing method according to claim 2, wherein the distribution ratio calculation step divides a range so that approximately 90% of pixels in a backlight image as a specific type of image exist in the lowest-luminance range and its adjacent range and approximately 10% of pixels exist in the highest-luminance range.

6. The image processing method according to claim 5, wherein a distribution ratio for the lowest-luminance range in a specific type of image is larger than a distribution ratio for a range adjacent thereto.

7. The image processing method according to claim 2, wherein the distribution ratio calculation step almost evenly divides a value range applicable to luminance components into five ranges; and the distribution ratio in the specific type of image is 5: 4: 0: 0: 1 in order from a low-luminance side of the divided ranges.

8. The image processing method according to claim 2, wherein the distribution ratio calculation step almost evenly divides a value range applicable to luminance components into five ranges which are $4.7 \leq A \leq 5.8$, $3.3 \leq B \leq 4.0$, $0.0 \leq C \leq 0.3$, $0.0 \leq D \leq 0.2$, and $0.6 \leq E \leq 1.0$ (where $A+B+C+D+E=10$).

9. The image processing method according to claim 2, wherein the similarity determination step determines similarity according to a value size which is found by dividing an inner product between a vector comprising a distribution ratio in the obtained image and a vector comprising a distribution ratio in the specific type of image by the product of both vector sizes.

10. The image processing method according to claim 9, wherein the similarity determination step determines that distribution ratios are similar to each other when an obtained value is larger than a specified threshold value.

11. The image processing method according to claim 2 wherein the image type determination step divides an image for the obtained image data into a specified peripheral area and a specified inside area, calculates an average value of luminance components for pixels belonging to each area, and does not determine that the image corresponds to a specific type when an area causing the average value to be maximum corresponds to the specified inside area.

12. The image processing method according to claim 11, wherein the image type determination step makes a negative value of a value found by dividing the inner product of the vectors in the similarity determination step by the product of both vector sizes with respect to an image in which the area causing the average value to be maximum corresponds to the specified inside area.

13. The image processing method according to claim 2, wherein the distribution ratio calculation step calculates the distribution ratio by correcting each pixel of the obtained image data so that a pixel whose luminance component is larger than a specified value produces a luminance component value larger than a luminance component of the pixel and a pixel whose luminance component is smaller than a specified value produces a luminance component value smaller than a luminance component of the pixel.

14. An image processing program which obtains image data expressing an image in dot-matrix pixels from a specified storage capacity and analyzes the image data to determine a type of image, wherein the program is embodied on a computer-readable medium and includes program instructions for causing a computer to implement:

a luminance component acquisition function to obtain a luminance component for each pixel from the obtained image data;

a distribution ratio calculation function to divide a value range applicable to luminance components into a plurality of ranges and calculate a distribution ratio of the number of pixels for luminance components included in each range to all pixels;

a similarity determination function to determine similarity between the distribution ratio in a predefined specific type of image and a distribution ratio calculated for the obtained image;

and an image type determination function to determine an image of the obtained image data to be the specific type when the similarity determination function determines the similarity between the distribution ratios.

15. An image processing program which obtains image data expressing an image in dot-matrix pixels from a specified storage capacity and analyzes the image data to determine a type of image, wherein the program is embodied on a computer-readable medium and includes program instructions for causing a computer to implement:

an image data acquisition function to obtain image data expressing an image in dot-matrix pixels;

a luminance component acquisition function to obtain a luminance component for each pixel from the obtained image data;

a distribution ratio calculation function to divide a value range applicable to luminance components into a plurality of ranges and calculating a distribution ratio of the number of pixels for luminance components included in each range to all pixels;

a similarity determination function to determine similarity between the distribution ratio in a predefined specific type of image and a distribution ratio calculated for the obtained image; and an image type determination function to determine an image of the obtained image data to be the specific type when the similarity determination function determines the similarity between the distribution ratios.

* * * * *